United States Patent
Wu et al.

(10) Patent No.: US 12,510,606 B2
(45) Date of Patent: Dec. 30, 2025

(54) METHOD FOR DETECTING EARTH FAULTS AND FREQUENCY CONVERTER SYSTEM WITH EARTH FAULT DETECTION

(71) Applicant: Hitachi Energy Ltd, Zurich (CH)

(72) Inventors: Dan Wu, Dietikon (CH); Beat Buchmann, Baden (CH); Christian Schlegel, Uitikon (CH)

(73) Assignee: HITACHI ENERGY LTD, Zurich (CH)

( * ) Notice: Subject to any disclaimer, the term of this patent is extended or adjusted under 35 U.S.C. 154(b) by 0 days.

(21) Appl. No.: 19/112,747

(22) PCT Filed: Sep. 23, 2022

(86) PCT No.: PCT/EP2022/076552
§ 371 (c)(1),
(2) Date: Mar. 18, 2025

(87) PCT Pub. No.: WO2024/061473
PCT Pub. Date: Mar. 28, 2024

(65) Prior Publication Data
US 2025/0258249 A1    Aug. 14, 2025

(51) Int. Cl.
G01R 31/52   (2020.01)
H02H 1/00    (2006.01)
H02H 7/12    (2006.01)

(52) U.S. Cl.
CPC ........... G01R 31/52 (2020.01); H02H 1/0007 (2013.01); H02H 7/1216 (2013.01)

(58) Field of Classification Search
CPC ...... G01R 31/52; G01R 31/50; H02H 1/0007; H02H 7/1216
See application file for complete search history.

(56) References Cited

U.S. PATENT DOCUMENTS 7,663,850 B2   2/2010 Leppänen
7,978,446 B2   7/2011 Lindsey
(Continued)

FOREIGN PATENT DOCUMENTS

CN   101487870 A   7/2009
CN   104364989 A   2/2015
(Continued)

OTHER PUBLICATIONS

Rodríguez-Valdez et al., "Method for line-ground fault detection in Variable Frequency Drives", 2011, IEEE, 7 pages.
(Continued)

*Primary Examiner* — Lee E Rodak
*Assistant Examiner* — Demetrius R Pretlow
(74) *Attorney, Agent, or Firm* — Procopio, Cory, Hargreaves & Savitch LLP

(57) ABSTRACT

A method of detecting earth faults, at a frequency converter connected between a first grid operating at a first frequency and a second grid operating at a different, second frequency, comprises determining a common mode voltage at the side of the converter connected to the second grid, determining levels of components of the first frequency and the second frequency in the common mode voltage, and determining if the levels are above pre-set threshold levels, indicating that an earth fault is present at the side of the converter connected to the grid operating at the respective frequency.

13 Claims, 3 Drawing Sheets

(56) References Cited

U.S. PATENT DOCUMENTS

| | | | |
|---|---|---|---|
| 2008/0151445 A1* | 6/2008 | Leppanen | H02H 9/08 |
| | | | 361/43 |
| 2009/0296289 A1 | 12/2009 | Valdez et al. | |
| 2013/0235618 A1* | 9/2013 | Dillig | H02H 7/1216 |
| | | | 363/16 |
| 2013/0322133 A1 | 12/2013 | Li | |
| 2015/0210506 A1* | 7/2015 | Kattainen | H02H 3/16 |
| | | | 187/393 |
| 2018/0241200 A1* | 8/2018 | Hu | H02H 3/162 |
| 2020/0041559 A1 | 2/2020 | Tallam et al. | |

FOREIGN PATENT DOCUMENTS

| | | | | |
|---|---|---|---|---|
| CN | 109417287 A | | 3/2019 | |
| CN | 112103915 A | * | 12/2020 | H02H 3/34 |

OTHER PUBLICATIONS

European Patent Office, International Preliminary Report On Patentability, mailed Nov. 21, 2024, 7 pages.

* cited by examiner

METHOD FOR DETECTING EARTH FAULTS AND FREQUENCY CONVERTER SYSTEM WITH EARTH FAULT DETECTION

The present application is a national stage entry of International Patent Application No. PCT/EP2022/076552, filed on Sep. 23, 2022, which is hereby incorporated herein by reference as if set forth in full.

The present disclosure relates to a method for detecting earth faults near a frequency converter connected between two AC grids. Furthermore, the present disclosure relates to a frequency converter system with earth fault detection.

An earth fault event at the converter terminal or inside the converter could cause severe damage to the converter and other connected electrical devices due to resulting high current or high voltage. Therefore, an accurate detection and fast protection reaction to an earth fault event are of great importance. Especially, determining on which side of the converter the earth fault happens is critical. Thereby, a specific protection action for the affected side can be initiated.

Prior art documents U.S. Pat. No. 7,663,850 B2 and U.S. Pat. No. 7,978,446 B2 disclose methods for detecting earth faults by using voltage sensors at a location where the earth fault occurs. For earth faults at a converter, voltage sensors are located at different sides of the converter.

Embodiments of the disclosure relate to an improved method of detecting earth faults at AC-AC frequency converters.

According to a first aspect, a method of detecting earth faults at a frequency converter connected between a first grid and a second grid, wherein the first grid operates at a first frequency and the second grid operates at a second frequency, wherein the first frequency is different from the second frequency, comprises determining a common mode (CM) voltage at the side of the converter connected to one of grids, e.g. the second grid. The method further comprises the steps of determining levels of components of the first frequency and the second frequency in the CM voltage and determining if the levels of the components are higher than pre-defined threshold levels, indicating that an earth fault is present at the side of the converter connected to the grid operating at the respective frequency.

This method allows detecting earth faults at both sides of the converter by utilizing voltage measurement only on one side of the converter. Accordingly, the voltage measurement at the side of the second grid also enables detecting an earth fault at the side of the first grid. Thus, a voltage sensor is required only on one side of the converter. This reduces costs and also increases the reliability of the detection, because of a reduction of components which could fail. Furthermore, less space is required for the installation of voltage sensors.

The first and second frequencies may be fundamental frequencies of the two AC grids. As an example, one of the grids may operate at 50 Hz and the other one of the grids may operate at 16.7 Hz. The grids can be single-phase or multi-phase. As an example, one of the grids is three-phase and one of the grids is single-phase.

Detectable earth faults are asymmetrical earth faults, i.e. earth faults which do not affect all phases of a grid so that the effect is not cancelled out in the common mode voltage. As an example, the earth fault may be present only in one or two phases of a three-phase grid.

In the method, determining the level of the first frequency can comprise carrying out a first filtering procedure on the CM voltage and determining the level of the second frequency can comprise carrying out a second filtering procedure on the CM voltage. Two different filtering procedures are used for extracting the frequency components. The levels of the components can then be determined by calculating average values such as a root mean square (RMS) value for the filtered voltages. Also other values such as a maximum value can be calculated. As an example, a first root mean square value is calculated after applying a first filtering procedure and a second root mean square value is calculated after applying a second filtering procedure of the CM voltage at the second grid side.

The first filtering procedure on the CM voltage can comprise transmitting the first frequency and attenuating the second frequency. The second filtering procedure can comprise transmitting the second frequency and attenuating the first frequency. In both filtering procedures, also one or more CM frequencies, e.g. a third harmonic of the fundamental frequency of the first or second grid, can be attenuated. This is beneficial in case that CM harmonic injection is used in the control algorithm of the converter for the side of the first or second grid.

As an example, band pass filters and band stop filters with characteristic frequencies equal to the first or second frequency and optional harmonics thereof, can be used. In case that CM harmonic injection is used for one side of the grid, a band stop filter with a characteristic frequency at the CM frequency of this grid is used in both filtering procedures.

The method may further comprise initiating a protection action for the side of the converter where the earth fault is detected to be present. Accordingly, a protection action may be initiated only at the first grid, only at the second grid or at both grids, depending on the detected earth fault. Different protection actions may be carried out for the first grid and the second grid.

According to a further aspect, a frequency converter system with selective earth fault detection comprises a frequency converter connected between a first grid and a second grid, a voltage sensor connected at the side of the converter connected to the second grid for determining a common mode voltage and an analyzer for determining levels of components of the first frequency and the second frequency in the common mode voltage and for determining if the levels are above pre-set threshold level. The frequency converter system may be configured to carry out the method as described in the foregoing.

The frequency converter system may comprise a first protection device and a second protection device for carrying out a protection action on the first grid and the second grid, respectively, wherein the analyzer is configured to provide a signal to the first protection device and/or the second protection device when an earth fault has been detected at the respective grid side. It is also possible that a signal is sent to the first and the second protection device to carry out a protection action, also when an earth fault has been detected only at one grid side.

The present disclosure comprises several aspects and embodiments. Every feature described with respect to one of the aspects and embodiments is also disclosed herein with respect to the other aspects and embodiments, even if the respective feature is not explicitly mentioned in this context.

Further features, refinements and expediencies become apparent from the following description of the exemplary embodiments in connection with the figures. In the figures, elements of the same structure and/or functionality may be referenced by the same reference signs. It is to be understood that the embodiments shown in the figures are illustrative representations and are not necessarily drawn to scale.

FIG. 1 shows a schematic diagram of a converter system according to an embodiment, FIG. 2 shows a schematic diagram of a method for detecting an earth fault according to an embodiment, FIGS. 3A to 3F show diagrams of common mode voltages for illustrating a filtering procedure according to an embodiment, FIGS. 4A to 4D show diagrams and method steps for detecting an earth fault in the first grid, FIGS. 5A to 5D show diagrams and method steps for detecting an earth fault in the second grid.

FIG. 1 shows a first grid 1 and a second grid 2 connected by a frequency converter 3 for AC-AC frequency conversion. The converter may have a commonly used topology, such as an AC-DC-AC with two-level or three-level NPC (neutral point clamping), as well as indirect MMC (modular multi-level converter) and AC-AC with a direct MMC, for example.

Depending on the application, each one of the grids 1, 2 comprises one phase or more than one phase. As an example each one of the grids 1, 2 can be a three-phase or a single-phase grid (e.g. railway grid). The grids 1, 2 may have the same number of phases or different number of phases. As a specific example, the first grid 1 may be three-phase with a fundamental frequency of 50 Hz. The second grid 2 may be single-phase with a fundamental frequency of 16.67 Hz.

The grids 1, 2 are AC grids, wherein a fundamental frequency of the first grid 1 is denoted as first frequency f1 and the fundamental frequency of the second grid 2 is denoted as second frequency f2, in the following. The first and second frequencies f1, f2 are different from each other. The fundamental frequency of each of the grids 1, 2 can be a fixed frequency or a time-variable frequency. For a time-variable frequency, the frequencies of the grids 1, 2 are different from each other at a specific time of operation. A time-variable frequency can be used in a variable machine drive busbar, for example. Both grids are high-impedance earthed. As examples, both grids operate at a constant frequency or both grids operate at time-variable frequencies or one of the grids operates at a constant frequency and the other one at a time-variable frequency.

An earth fault event at a converter terminal or inside the converter 3 may cause severe damage to the converter 3 and other connected electrical devices. As an example, a single-phase-to-earth-fault may gradually lead to a fault on further phases, resulting in high current or high voltage. Therefore, an accurate detection and fast protection reaction to an earth fault event are of great importance. Ideally, the system is switched off before larger damage occurs. Especially, distinguishing on which side of the converter 3 the earth fault happens is critical. This, on one hand, could help the operator to quickly identify and clear the fault, and on the other hand, could facilitate different protection actions for earth faults happening on different sides of the converter 3.

For this aim, a voltage sensor 4 is installed at a side of the converter 3 connected to one of the grids 1, 2. In the shown embodiment, the voltage sensor 4 is installed at the converter terminal connected to grid 2. For the disclosed method, it is sufficient that a voltage sensor 4 is installed only at one grid side so that only the voltage at this side is measured.

An analyzer 5 receives and analyzes the measured voltage. The frequency analyzer 5 may be an integral part of the voltage sensor 4 or may be separate from the voltage sensor 4. The frequency analyzer 5 is configured to detect the presence of an earth fault and determines the grid side at which the earth fault occurs. Accordingly, the earth fault is selectively detected.

Further components may be present in a frequency converter system 6 as depicted. Often, a transformer is also connected between the converter 3 and the grids 1, 2 due to isolation considerations. The transformer may also be referred to as a part of the converter 3. It is also possible that a transformer is not present.

FIG. 2 shows a method for analyzing the measured voltage for selective earth fault detection. In a first method step A, a common mode (CM) voltage is calculated based on the measured voltage for grid 2. The CM voltage can be directly calculated by the sensor 4 or the analyzer 5. For a three-phase system with voltages $U_{2a}$, $U_{2b}$, $U_{2c}$ on the three-phases a, b, c on grid 2, the common mode voltage $U_{2cm}$ is calculated as $$u_{2cm} = \frac{u_{2a} + u_{2b} + u_{2c}}{3}$$

and for a two-phase system, the common mode voltage is $$u_{2cm} = \frac{u_{2a} + u_{2b}}{2}.$$

In normal operation, the CM voltage of the second grid 2 should only contain a small amount of CM frequency components, e.g. a DC component and $3^{rd}$, $6^{th}$ etc. harmonic components.

In the case of an asymmetrical earth fault, i.e., an earth fault which is present not in all phases of one of the grids 1, 2, the frequency component in the CM voltage of the second grid 2 is:

if high-impedance single-phase to ground fault occurs on the side of the first grid 1: a significant level of fundamental frequency $f_1$ of first grid 1 (see FIGS. 3C, 3D);

if high-impedance single-phase to ground fault occurs on the side of the first grid 2: a significant level of fundamental frequency $f_2$ of second grid 2 (see FIGS. 3E, 3F).

In a further method step B, a filtering procedure extracts the above frequency components from the CM voltage.

A first filtering procedure 7 serves to detect an earth fault at the side of the first grid 1. The calculated CM voltage may be filtered by $2^{nd}$ order IIR (infinite impulse response) filters, for example.

The filtering procedure 7 may comprise the following filters:

a band pass filter ($BPf_1$) with characteristic frequency $f_c$ equaling the fundamental frequency $f_1$ of the first grid 1, i.e. $f_c=f_1$, a band stop filter ($BSf_2$) with characteristic frequency $f_c$ equaling the fundamental frequency $f_2$ of the second grid 2, i.e. $f_c=f_2$; thereby, a wrong detection can be prevented in case of an earth fault on the second grid 2, a band stop filter ($BSf_{x\_cm}$) with characteristic frequency $f_c$ equaling the common mode frequency of the first grid 1 or the second grid 2; this is useful when CM harmonic injection is used in the control algorithm of the converter 3 on the side of one of the grids 1, 2.

A second filtering procedure 8 can be used for earth fault detection on the side of the second grid 2.

The filtering sub-procedure 8 may comprise the following filters:
- a band pass filter (BP) with characteristic frequency $f_c$ equaling the fundamental frequency $f_2$ of the second grid 2, i.e. $f_c=f_2$,
- a band stop filter ($BSf_1$) with characteristic frequency $f_c$ equaling the fundamental frequency $f_1$ of the first grid 1, i.e. $f_c=f_1$; thereby, a wrong detection can be prevented in case of an earth fault on the first grid 1,
- a band stop filter ($BSf_{x\_cm}$) with characteristic frequency $f_c$ equaling the common mode frequency of the first grid 1 or the second grid 2; this is useful when CM harmonic injection is used in the control algorithm of the converter 3 on the side of one of the grids 1, 2.

In case of a grid with variable frequencies, frequency adaptive filters such as adaptive $2^{nd}$ order IIR filters can be used.

A gain compensation may be added to the above cascaded filters to set the total gain at the band passed frequency to 1 and compensate the attenuation caused by the filter itself.

In a further step C, values characteristic for the magnitudes of the first frequency component and the second frequency component are calculated based on the processed signals. As examples, the value can be an RMS value, an instantaneous value, a maximum value or an average value. The RMS value of a signal S is calculated as follows:

$$S_{RMS} = \sqrt{(t2-t1)\int_{t1}^{t2} S^2(t)dt}$$

After that, it is determined if the RMS values are equal or above a pre-set threshold levels $L_1$, $L_2$. An RMS value being equal or larger than the respective threshold level $L_1$, $L_2$ at a specific time or duration indicates an earth fault error at the respective grid.

Depending on the determined earth fault on one of the grids, in step D, a protection action can be initiated. For this aim, a signal is sent to one or more earth fault protection devices 9, 10 for initiating a protection action on the first grid 1 or the second grid 2, depending on the detected earth fault. It is also possible that the analyzer 5 and one or more of the protection devices 9, 10 is integrated in the same device.

FIGS. 3A to 3F show diagrams of CM voltage $U_{2cm}$ and frequencies components in a converter system 6 as shown in FIG. 1 during normal operation and during an earth fault.

The converter system 6 may comprise high-impedance earthed transformers on both sides. The converter 3 connects a three-phase 50 Hz system (first grid 1) and a single-phase 16.7 Hz system (second grid 2). The grids can be defined also vice-versa. The voltage sensor 4 is only located on the converter terminal connected to the second grid 2. On the side of the first grid 1, the converter modulation injects a $3^{rd}$ harmonic, i.e., 150 Hz.

Figure 3A:
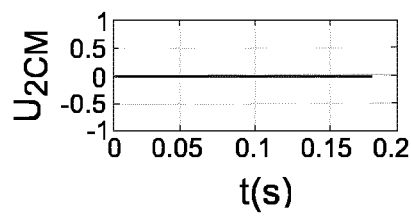
FIG. 3A shows that during normal operation, the calculated CM voltage $U_{2cm}$ for the second grid 2 is around zero during the monitoring time t.
Figure 3B:
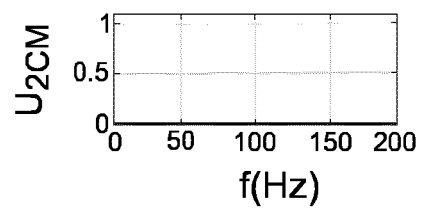
FIG. 3B shows the frequency domain of the signal of FIG. 3A during normal operation, which is also around zero for all frequencies.
Figure 3C:
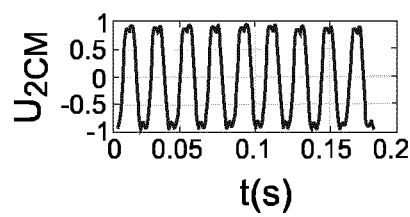
Figure 3D:
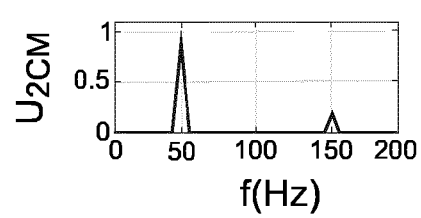

FIGS. 3C and 3D show the CM voltage $U_{2cm}$ during a single-phase-to-ground (1 ph-G) fault on the side of the first grid 1. The main frequency components are 50 Hz and 150 Hz.

Figure 3E:
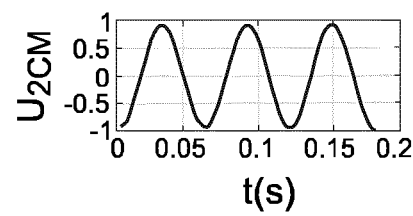
Figure 3F:
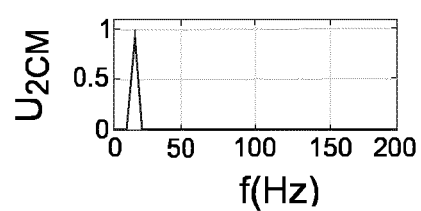

FIGS. 3E and 3F show the CM voltage $U_{2cm}$ during a single-phase-to-ground (1 ph-G) fault on the side of the second grid 2. The main frequency components is 16.67 Hz.

Figure 1:
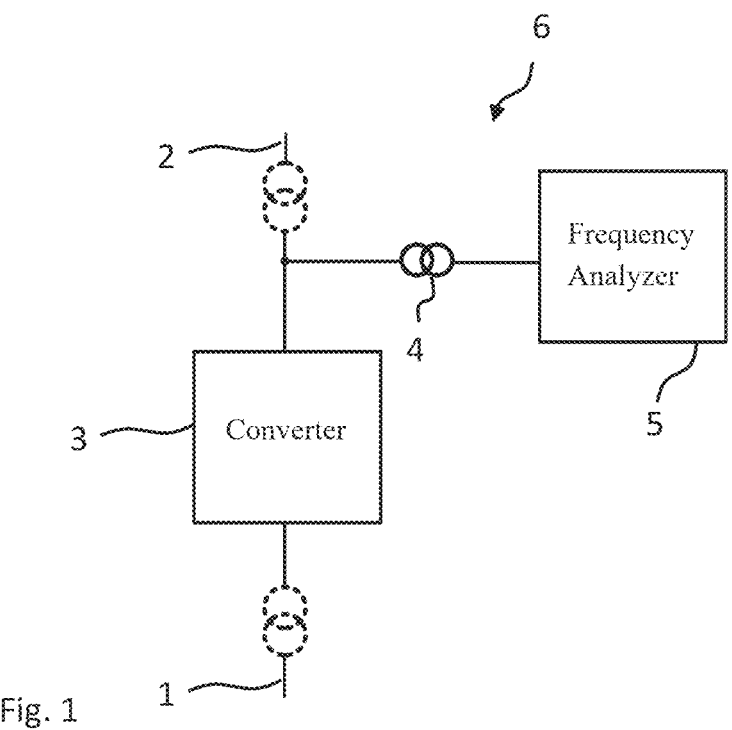

FIGS. 4A to 4D show diagrams of CM voltage $U_{2cm}$ and frequencies components thereof in a converter system 6 as shown in FIG. 1 during normal operation and during an earth fault only at the first grid 1.

Figure 4A:
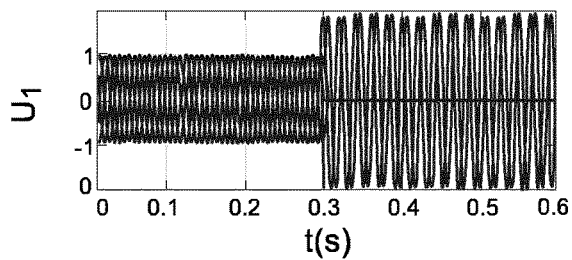

FIG. 4A shows the voltages on three-phases during a single-phase-to-ground (1 ph-G) fault occurring at a time t=0.3 s on the side of the first grid 1. The fundamental frequency $f_1$ of the first grid 1 is 50 Hz.

Figure 4B:
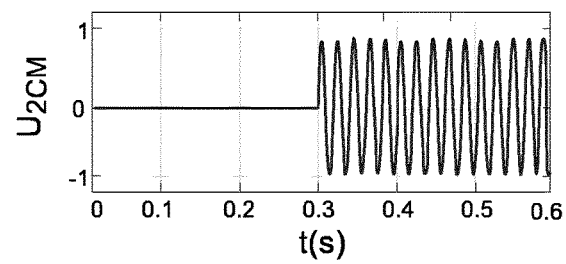

FIG. 4B shows the CM voltage $U_{2cm}$ during the single-phase-to-ground fault at the side of the first grid 1 as shown in FIG. 4A.

Figure 2:
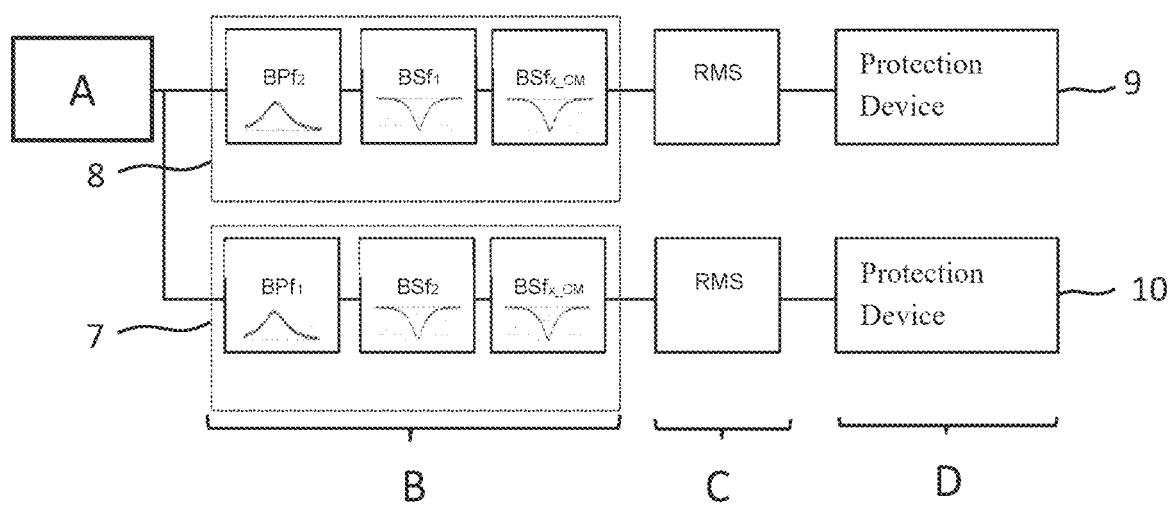
Figure 4C:
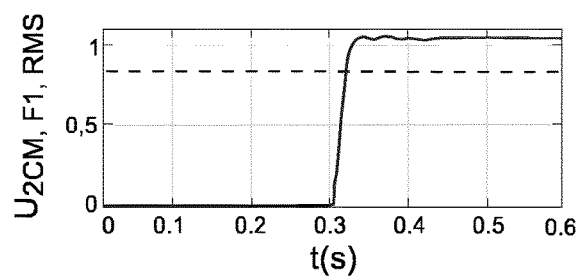

FIG. 4C shows the RMS value of the processed CM voltage $U_{2cm}$ according to the first filtering procedure 7 for detecting earth faults on the side of the first grid 1. The processed voltage is denoted as $U_{2CM,F1,RMS}$. The first filtering procedure 7 described in step B of FIG. 2 has been applied and the RMS value as described for step C has been calculated.

The filtering path for earth faults on the first grid 1 as applied includes a bandpass filter with 50 Hz, a band stop filter with 16.7 Hz and a band stop filter with 150 Hz.

The calculated RMS value $U_{2CM,F1,RMS}$ is near 1. The pre-defined threshold level $L_1$ for the first frequency component is 0.8. The numbers are given in a per-unit-system. The base value can be the grid rated phase-to-ground voltage peak value. As the calculated RMS value $U_{2CM,F1,RMS}$ is above this level, an earth fault is detected to be present at the first grid 1.

Figure 4D:
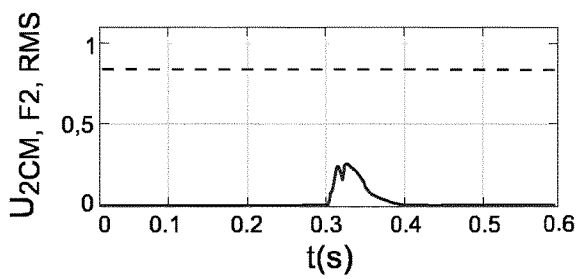

FIG. 4D shows the RMS value of the processed CM voltage $U_{2cm}$ according to the second filtering procedure 8 for detecting earth faults on the side of the second grid 2. The processed voltage is denoted as $U_{2CM,F2,RMS}$. The second filtering procedure 8 described in step B of FIG. 2 has been applied and the RMS value as described for step C has been calculated.

The filtering path for earth faults on the second grid 2 as applied includes a bandpass filter with 16.7 Hz, a band stop filter with 50 Hz and a band stop filter with 150 Hz.

The calculated RMS value $U_{2CM,F2,RMS}$ is, after a small peak due to filter overshoot or filter inrush, near to zero. The pre-defined voltage level $L_2$ for a fault on the second grid 2 is also 0.8. As the calculated RMS value $U_{2CM,F2,RMS}$ is below this level, an earth fault is detected as not being present on the second grid 2.

Accordingly, an earth fault is detected to be present only on the first grid 1 and a respective protection action for the first grid 1, but not for the second grid 2, is triggered.

FIGS. 5A to 5D show diagrams of CM voltage $U_{2cm}$ and extracted frequency components in a converter system 6 as shown in FIG. 1 during normal operation and during an earth fault only at the second grid 2.

Figure 5A:
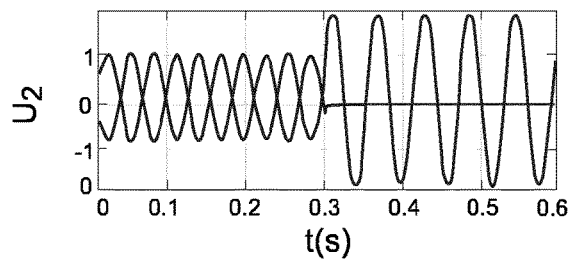

FIG. 5A shows the voltages on two phases during a single-phase-to-ground (1 ph-G) fault occurring at a time t=0.3 s on the side of the second grid 2. The fundamental frequency $f_2$ of the second grid 2 is 16.7 Hz.

Figure 5B:
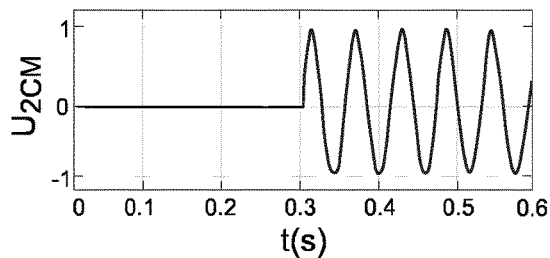

FIG. 5B shows the CM voltage $U_{2cm}$ during the single-phase-to-ground fault as shown in FIG. 5A on the side of the second grid 2.

Figure 5C:
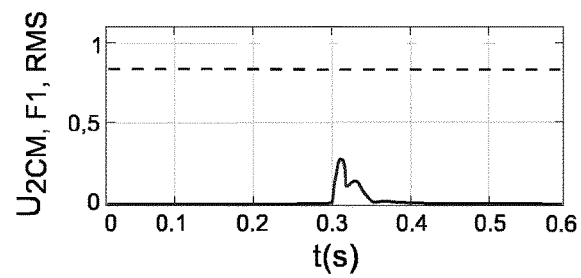

FIG. 5C shows the RMS value of the processed CM voltage $U_{2cm}$ according to the first filtering procedure 7 for detecting earth faults on the side of the first grid 1. The same filtering procedure and RMS value calculation as described in FIG. 4C has been applied.

The calculated RMS value $U_{2CM,F1,RMS}$ is, after a short peak, near 0. As the calculated RMS value $U_{2CM,F1,RMS}$ is below the pre-defined level $L_{1}=0.8$, an earth fault is detected as not being present for the first grid 1.

Figure 5D:
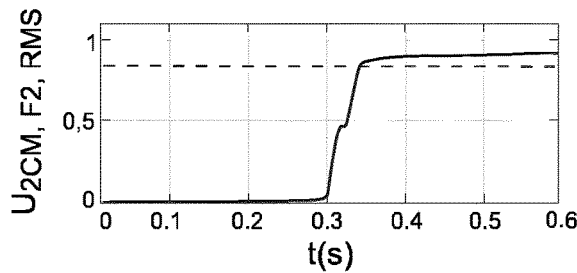

FIG. 5D shows the RMS value of the processed CM voltage $U_{2cm}$ in accordance with the description of FIG. 4D. The calculated RMS value $U_{2CM,F2,RMS}$ is above the pre-defined level $L_2=0.8$.

Accordingly, an earth fault is detected to be present only on the second grid 2 and a respective protection action is triggered.

In some embodiments, the pre-defined voltage levels $L_1$, $L_2$ for detection of an earth fault for the first grid 1 and for the second grid 2 may be different from each other.

Overall, the disclosed method and converter system 6 allows selectively detecting an earth fault on the side of the first grid 1 (FIGS. 4A to 4D) and an earth fault on the side of the second grid 2 (FIGS. 5A to 5D) by using only a voltage measurement on one side of the converter 3.

REFERENCE SIGNS

1 first grid
2 second grid
3 converter
4 voltage sensor
5 frequency analyzer
6 converter system
7 first filtering procedure
8 second filtering procedure
9 protection device
10 protection device
$f_1$ first frequency
$f_2$ first frequency
$U_{2a}$, $U_{2b}$, $U_{2c}$ voltages for three-phases on second AC grid
$U_{2cm}$ common mode voltage on second AC grid
$U_{2CM,F2,RMS}$ RMS value of filtered common mode voltage, filter for grid 2 fault
$U_{2CM,F1,RMS}$ RMS value of filtered common mode voltage, filter for grid 1 fault
$BPf_1$ band pass filter with characteristic frequency at $f_1$
$BPf_2$ band pass filter with characteristic frequency at $f_2$
$BSf_1$ band stop filter with characteristic frequency at $f_1$
$BSf_2$ band stop filter with characteristic frequency at $f_2$
$BSf_{x\_cm}$ band stop filter with characteristic frequency at CM frequency of grid 1 or 2
RMS rms value
$f_c$ characteristic frequency of filter
A, B, C, D method steps

The invention claimed is:

1. A method of detecting earth faults at a frequency converter connected between a first grid and a second grid, wherein the first grid operates at a first frequency and the second grid operates at a different, second frequency, the method comprising:
   determining a common mode voltage at a side of the converter connected to one of the grids,
   determining levels of components of the first frequency and the second frequency in the common mode voltage, wherein determining the level of the component of the first frequency comprises applying a first filtering procedure on the common mode voltage and wherein determining the level of the component of the second frequency comprises applying a second filtering procedure on the common mode voltage,
   determining if the levels are above pre-set threshold levels, indicating that an earth fault is present at the side of the converter connected to the grid operating at the respective frequency, and
   initiating a protection action at the side of the converter where the earth fault is indicated to be present or at both sides of the converter.

2. The method of claim 1, wherein determining the levels of the components comprises calculating average values or maximum values after applying the first filtering procedure and after applying the second filtering procedure.

3. The method of claim 1, wherein in the first filtering procedure, the first frequency is transmitted and the second frequency is attenuated, and in the second filtering procedure the second frequency is transmitted and the first frequency is attenuated.

4. The method of claim 1, wherein the first filtering procedure comprises using a band pass filter with a characteristic frequency at the first frequency and a band stop filter with a characteristic frequency at the second frequency, and the second filtering procedure comprises using a band pass filter with a characteristic frequency equal to the second frequency and a band stop filter with a characteristic frequency of the first frequency.

5. The method of claim 1, wherein the first and second filtering procedures comprise using a band stop filter with a characteristic frequency equal to a harmonic of the first frequency and/or the second frequency.

6. The method of claim 1, wherein a gain compensation is carried out after the first and second filtering procedures to set the total gain of the transmitted frequency to 1.

7. The method of claim 1, wherein the first threshold level is different from the second threshold level.

8. The method of claim 1, wherein a first one of the pre-set threshold levels is equal to a second one of the pre-set threshold levels.

9. The method of claim 1, wherein at least one of the first grid and the second grid operates at a time-variable frequency.

10. The method of claim 1, wherein at least one of the first grid and the second grid operates at a fixed frequency.

11. A frequency converter system with selective earth fault detection, comprising
   a frequency converter connected between a first grid configured to operate at a first frequency and a second grid configured to operate at a second frequency,
   a voltage sensor for determining a common mode voltage, the voltage sensor being connected between the frequency converter and one of the grids, and
   a processing device for determining levels of components of the first frequency and the second frequency in the common mode voltage and for determining if the levels are above pre-set threshold levels, wherein determining the level of the component of the first frequency comprises applying a first filtering procedure on the common mode voltage and wherein determining the level of the component of the second frequency comprises applying a second filtering procedure on the common mode voltage.

12. The frequency converter system of claim 11, wherein a voltage sensor is installed only at one side of the converter.

13. The frequency converter system of claim 11, comprising a first protection device and a second protection device for carrying out a protection action on the first grid and the second grid, respectively, wherein the processing device is configured to provide a signal to the first protection device and/or the second protection device when an earth fault has been detected on the respective grid side or to provide a signal to both protection devices.

\* \* \* \* \*